United States Patent
Schimpf et al.

(10) Patent No.: US 9,033,844 B2
(45) Date of Patent: May 19, 2015

(54) DIFFERENTIAL GEAR

(71) Applicant: Schaeffler Technologies GmbH & Co. KG, Herzogenaurach (DE)

(72) Inventors: Ralph Schimpf, Fuerth (DE); Thorsten Biermann, Wachenroth (DE); Franz Kurth, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/224,884

(22) Filed: Mar. 25, 2014

(65) Prior Publication Data

US 2014/0309075 A1 Oct. 16, 2014

(30) Foreign Application Priority Data

Apr. 16, 2013 (DE) .......................... 10 2013 206 749

(51) Int. Cl.

| *F16H 48/20* | (2012.01) |
| *F16H 48/22* | (2006.01) |
| *F16H 48/32* | (2012.01) |
| *F16H 48/11* | (2012.01) |
| *F16H 48/10* | (2012.01) |

(52) U.S. Cl.
CPC ............... *F16H 48/22* (2013.01); *F16H 48/11* (2013.01); *F16H 48/32* (2013.01); *F16H 2048/106* (2013.01)

(58) Field of Classification Search
USPC .................. 475/231, 248, 249, 331, 332, 338
See application file for complete search history.

(56) References Cited

U.S. PATENT DOCUMENTS

| 5,527,229 | A  | * | 6/1996 | Ishihara et al. ............... 475/249 |
| 7,083,541 | B2 | * | 8/2006 | Pecnik et al. ................. 475/221 |
| 7,452,301 | B2 | * | 11/2008 | Yoshioka ...................... 475/231 |
| 7,717,818 | B2 | * | 5/2010 | Suzuki et al. ................. 475/150 |
| 2002/0049110 | A1 | * | 4/2002 | Ishikawa ...................... 475/223 |
| 2006/0052207 | A1 | * | 3/2006 | Teraoka ........................ 475/231 |

FOREIGN PATENT DOCUMENTS

DE 102008037885 A1 3/2010

* cited by examiner

*Primary Examiner* — Justin Holmes
(74) *Attorney, Agent, or Firm* — Simpson & Simpson, PLLC

(57) ABSTRACT

A differential gear having a gear housing, an epicyclic gear housing which is arranged in the gear housing in a manner allowing rotation about a gear axis, a planetary carrier which is arranged in the epicyclic gear housing coaxial to the gear axle, a first output sun gear, a second output sun gear, a planetary arrangement accommodated in the planetary carrier for the purpose of coupling the two output sun gears in a manner allowing rotation in opposite directions, a brake device having a brake disk pack for the purpose of generating a coupling torque which couples the planetary carrier to the epicyclic gear housing, and an actuating mechanism for the purpose of generating an axial force which engages the brake device. The planetary arrangement comprises multiple revolving planets which as such are able to rotate about planetary axes which are oriented parallel to the gear axle.

10 Claims, 1 Drawing Sheet

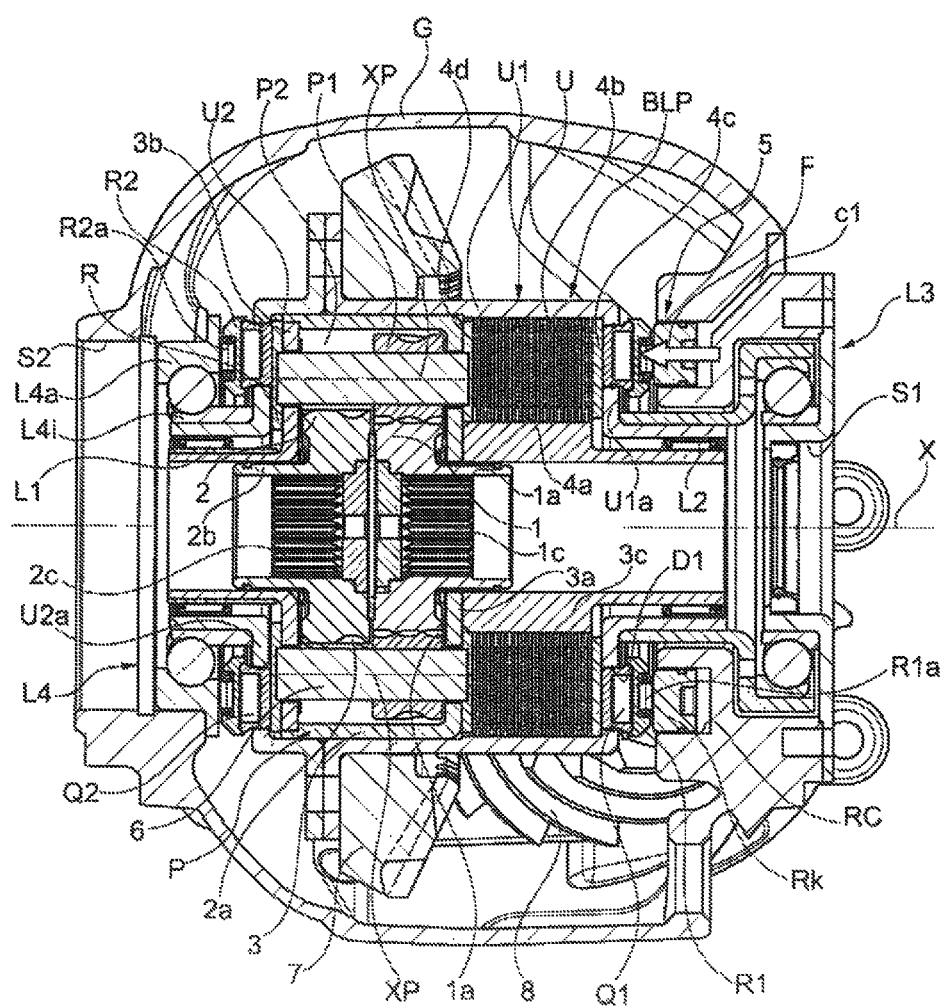

DIFFERENTIAL GEAR

CROSS-REFERENCE TO RELATED APPLICATIONS

This patent claims priority from German Patent Application No. 10 2013 206 749.6, filed Apr. 16, 2013, which application is incorporated herein by reference to its entirety.

FIELD OF THE INVENTION

The invention relates to a differential gear having a gear housing, an epicyclic gear housing which is arranged in the gear housing in a manner allowing rotation about a gear axis, and a planetary carrier which sits in the epicyclic gear housing, wherein the drive power applied to the epicyclic gear housing is split by means of this differential gear, and the planetary carrier and the epicyclic gear housing can be selectively coupled to each other by a friction fit via a coupling device.

BACKGROUND OF THE INVENTION

Differential gears are generally constructed as planetary wheels, and most commonly serve the purpose of splitting or distributing an input power, supplied by a power input, to two drive shafts. Differential gears are most frequently used in the building of automobiles as so-called axle differentials. In this case, drive power supplied by a drive motor is distributed via the differential gear to wheel drive shafts of driven wheels. The two wheel drive shafts leading to the wheels in this case are each driven at the same torque, meaning they are balanced. When the vehicle drives straight forward, both wheels rotate at the same speed. When the vehicle travels a curve, the rotation speeds of each wheel are different. The axle differential makes this rotation speed difference possible. The rotation speeds are able to adjust themselves freely; only the average of the two speeds is unchanged.

In certain applications, particularly in all-wheel drive vehicles, differential gears are used which enable a switchable decoupling when the all-wheel drive function is not necessary, and additionally enable a separation in the drivetrain in order to drive the vehicle via only one axle, thereby reducing friction loss in the drive system, the same being not necessary at the moment, but otherwise driven anyway. Such a differential gear is known from DE 10 2008 037 885 A1, by way of example.

The problem addressed by the invention is that of creating a differential gear which enables a switchable release of the drive connection between the power input and the two power outputs, and which is characterized by a robust construction which can be realized in a cost-effective manner, wherein the differential gear generates the least possible drag torque when idling—meaning when the connection between the power input and the two power outputs is released.

BRIEF SUMMARY OF THE INVENTION

The problem named above is addressed according to the invention by a differential gear, having a gear housing, an epicyclic gear housing which is arranged in the gear housing in a manner allowing rotation about a gear axis, a planetary carrier which is arranged in the epicyclic gear housing coaxial to the gear axle, a first output sun gear, a second output sun gear, a planetary arrangement accommodated in the planetary carrier for the purpose of coupling the two output sun gears in a manner allowing rotation in opposite directions, a brake device having a brake disk pack which generates a coupling torque which couples the planetary carrier to the epicyclic gear housing, and an actuating mechanism for the purpose of generating an axial force which engages the brake device, wherein the planetary arrangement comprises multiple revolving planets which as such are able to rotate about planetary axes which are oriented parallel to the gear axle, and the brake device and the planetary carrier are matched to each other in such a manner that the brake disk pack is positioned at the radial distance of the planetary axes.

In this way, it is advantageously possible to create a differential gear wherein it is possible for the axial forces which are necessary to bring about the coupled state of the brake device to be at least partially directed via the planetary wheel pins, the same providing support axially, in a manner which is advantageous for the structural mechanics of the differential gear.

The differential gear according to the invention is advantageously constructed in such a manner that the brake disk pack is composed of multiple annular brake disks. These brake disks can be designed as flat steel sheet metal hollow disks, which are optionally coated with a friction material layer. The brake disk pack in this case can be constructed in such a manner that it comprises brake disks which are kinematically coupled to the planetary carrier via an inner peripheral contour, in a manner allowing axial displacement, but which is nevertheless non-rotatable. In addition, the brake disk pack then also comprises brake disks which are kinematically coupled to the epicyclic gear housing via an outer peripheral contour, in a manner allowing axial displacement, but which is nevertheless non-rotatable.

According to one particularly preferred embodiment of the invention, the axial support of the brake disk pack is realized in interaction with a pressure ring element, wherein this pressure ring element is supported on the end faces of the planet pins.

The epicyclic gear housing included for the purpose of receiving the planetary carrier is preferably designed as a two-part bowl housing which is composed of a first bowl element and a second bowl element, wherein the first bowl element has a base section which extends inward radially. This base section of the first bowl element can be configured with cylindrical passages which pass through the base section sequentially at points evenly distributed around the periphery. Plunger elements of a first set of plunger elements can be received in these passages, wherein the plunger elements are guided in the passages in a manner allowing axial sliding toward the planet axes. These plunger elements function as pressure transmission organs between the interior of the bowl housing and the exterior of the same.

A roller guide ring is preferably seated on the plunger elements, on a side of the same which is opposite the brake disk pack, and said roller guide ring can be loaded axially via an annular piston element for the purpose of axially compressing the brake disk pack. This annular piston element is preferably received in a circular chamber which is concentric to the gear axle, and able to move axially according to the magnitude of a fluid pressure applied to the circular chamber. This annular piston presses the rollers of the roller guide ring, wherein said rollers run on the same, into the planetary carrier—meaning in the direction of the brake disk pack—when the fluid pressure is adequate.

According to one particularly advantageous embodiment, the planetary carrier is likewise supported on the side thereof which is opposite the brake disk pack by plunger elements, which in turn are guided through a base surface of the epicyclic gear housing, and supported on the end face thereof on a second roller ring. These plunger elements can have the same construction as the first plunger elements named above.

A ring gear is preferably seated on the epicyclic gear housing. The power input into the epicyclic gear housing is realized via this ring gear. A right-angled drive can be implemented with an interface to this ring gear. This construction is particularly suitable for use as a rear differential which can be reversibly disengaged. It is also possible to arrange a spur gear on the epicyclic gear housing in the place of the ring gear, for the purpose of inputting the drive power.

The inner differential included in this case, the same accommodated in the interior of the epicyclic gear housing, is designed as a spur gear differential having two output sun gears which are able to rotate in opposite directions, via a planetary arrangement. This spur gear differential is, according to a particularly preferred embodiment of the invention, designed with a Wildhaber/Novikov toothing. Details on the geometries which are preferably implemented on the respective toothed wheels in this case, as well as the addendum and foot circle diameters of the output sun gears and the revolving planet gears which engage with the same, are explained in the description of the figures.

BRIEF DESCRIPTION OF THE DRAWINGS

Further details and features of the invention are found in the following description, with reference to the drawing, wherein:

FIG. 1 shows an axial cutaway view which clarifies the construction of a differential gear according to the invention, wherein the coupling of the planetary carrier to a bowl housing which receives the same is realized via a brake disk pack, which extends along the radial distance or track of the planet gear bearing pin axes with respect to the gear axle.

DETAILED DESCRIPTION OF THE INVENTION

The illustration according to FIG. 1 shows a differential gear according to the invention. The same has gear housing G and epicyclic gear housing U which is mounted in gear housing G in a manner allowing rotation about gear axis X. Planetary carrier 3 is received in epicyclic gear housing U, which in turn is arranged coaxially to gear axle X.

The differential gear further comprises first output sun gear 1, second output sun gear 2, and planetary arrangement P accommodated in planetary carrier 3, for the purpose of coupling two output sun gears 1, 2 in a manner allowing rotation in opposite directions. A brake device is positioned in the differential gear, which in this case is designed as brake disk pack BLP, for the purpose of generating a coupling torque which selectively couples planetary carrier 3 to epicyclic gear housing U, according to the magnitude of axial force F engaging brake disk pack BLP.

In addition, the differential gear according to the invention has actuating mechanism 5 for the purpose of generating axial force F applied to the brake disk pack 4a, 4b. Brake disk pack BLP is integrated into the differential gear in such a manner that it couples planetary carrier 3 to epicyclic gear housing U with a friction fit when there is a corresponding axial load. As a result of this approach, it is possible to release the drive connection between planetary carrier 3 and epicyclic gear housing U by unloading brake disk pack BLP and/or to couple planetary carrier 3 to epicyclic gear housing U with a friction fit by means of loading brake disk pack BLP axially.

The differential gear which in this case includes planetary carrier 3, planetary arrangement P and output sun gears 1, 2 is designed as a spur gear differential with two output sun gears 1, 2. Planetary arrangement P has multiple revolving planets P1, P2 which are mounted as such on planet pins 6. The differential gear according to the invention includes disk pack BLP and planetary carrier 3 matched to each other in such a manner that brake disk pack BLP is positioned at the radial or track distance of planet axes XP which are parallel to gear axle X. As a result of this special construction, axial forces F acting on brake disk pack BLP can be divided axially through planetary carrier 3 while incorporating planet pins 6, the same oriented parallel to gear axle X.

Brake disk pack BLP has a set of first, annular brake disks 4a which engage with planetary carrier 3 via an inner edge contour thereof, in a non-rotatable manner, but nevertheless allowing axial sliding. Brake disk pack BLP has a set of second brake disks 4b which engage with epicyclic gear housing U via an outer edge contour, in a non-rotatable manner, but nevertheless allowing axial sliding. These brake disks 4a, 4b are designed as flat steel sheet metal hollow disks, and preferably are coated with a friction material layer.

The axial support of brake disk pack BLP on planet pins 6 is realized with the integration of pressure ring element 4d which is supported on the end faces of planet pins 6. The planetary carrier 3 and brake disk pack BLP are matched to each other in such a manner that the radial distance of each of planet pin axes XP from gear axle X is greater than the inner diameter of brake disk 4a, 4b, and also is smaller than the outer diameter of brake disk 4a, 4b.

Epicyclic gear housing U included for the purpose of receiving planetary carrier 3 is designed as a two-part bowl housing, and composed of first bowl element U1 and second bowl element U2, wherein first bowl element U1 has base section U1a which extends inward radially. This base section U1a of first bowl element U1 in this case is configured with circular passages D1 which pass through base section U1a in sequential positions at equal distances around the periphery. Plunger elements Q1 of a first set of plunger elements sit in these passages D1. These plunger elements Q1 are guided in passages D1 in a manner allowing axial sliding in direction of planet axes XP. These plunger elements Q1 function as pressure transmission organs between the inner region of bowl housing U and the outer region of the same. Roller guide ring R1 is seated on a side of plunger elements Q1, on these plunger elements Q1, the side being opposite brake disk pack BLP, wherein roller guide ring R1 can be loaded axially via annular piston RK, for the purpose of axially pressing brake disk pack BLP together.

Annular piston element RK is received in circular chamber RC which is concentric with gear axle X, and can be moved axially according to the magnitude of a fluid pressure applied to circular chamber RC via fluid channel C1. This annular piston element RK impels rollers R1a of roller guide ring R1, the rollers running toward the same, toward planetary carrier 3, meaning in the direction of brake disk pack BLP. Circular chamber RK above is directly molded into gear housing G in this case.

Planetary carrier 3 is likewise supported by plunger elements Q2 on the side thereof which is opposite brake disk pack BLP, the plunger elements in turn being guided through base surface U2a of epicyclic gear housing U and supported on the end face thereof by second roller ring R2. These plunger elements Q2 are designed with the same construction as the first plunger elements Q1 described above.

Roller ring R2 carries roller arrangement R2a which runs directly to an end face of outer bearing ring L4a of bearing L4 which supports epicyclic gear housing U. Roller ring R2 can be designed in such a manner that it is centered by inner bearing ring L4i of bearing L4.

Plunger elements Q1, Q2 can be seated sectionally in suitable receiving pockets of roller rings R1, R2, and optionally secured, to prevent them from falling out, in the same by means of a press-fit, by way of example. A locking device can be implemented by means of the plunger elements Q1, Q2 in relation to the roller rings R1, R2, such that roller rings R1, R2 are able to travel together axially with the plunger elements functionally assigned to the same, but are not able to rotate with respect to epicyclic gear housing U.

First and second revolving planets P1, P2 engage directly with each other, and are therefore coupled in a driving relationship to each other, in such a manner that they rotate in opposite directions, as will be explained below in greater detail. In this embodiment, there are a total of three revolving planets P1 which engage with first output sun gear 1. These revolving planets P1 which engage with first output sun gear 1 form a first set of revolving planets. In addition, in this embodiment, there are a total of three revolving planets P2 which engage with second output sun gear 2. These revolving planets P2 which engage with second output sun gear 2 form a second set of revolving planets. Each revolving planet P1 of the first set engages with one revolving planet P2 of the second set. The engagement of revolving planets P1 of the first set with revolving planets P2 of the second set is realized at the same tooth plane as the engagement of revolving planets P1 of the first set with output sun gear 1.

First output sun gear 1 and second output sun gear 2 are matched to each other, in regards to the tooth geometry thereof, in such a manner that the addendum circle of spur gear toothing 1a of first output sun gear 1 is smaller than the root circle of output sun gear toothing 2a of second output sun gear 2. Revolving planets P1 of the first set engage with revolving planets P2 of the second set in the region of the tooth plane of first output sun gear 1. Two output sun gears 1, 2 are directly adjacent to each other.

Two output sun gears 1, 2 are designed in such a manner that that output sun gear toothing 1a of first output sun gear 1, and output sun gear toothing 2a of second output sun gear 2 have the same number of teeth. Revolving planets P1 of the first set and revolving planets P2 of the second set also have the same number of teeth. The input of the drive power into the differential gear is realized via ring gear 7 and the epicyclic gear housing U. A symmetrical division of torque and a division of power to output sun gears 1, 2 is realized via revolving planets P1, P2. Flange sections 1b, 2b are constructed on output sun gears 1, 2. These flange sections 1b, 2b are produced by extrusion in a molding process, and are configured with inner toothing 1c, 2c. End segments of wheel drive shafts or other power transfer components of the respective wheel drivetrain can be inserted into this inner toothing 1c, 2c, the end segments accordingly having complementary toothing. In place of the inner toothing shown here, other connection geometries can also be possible for the transmission of rotational torque, and for centering and receiving corresponding components.

Ring gear 7 seated on epicyclic gear housing U in a non-rotatable manner is driven via primary drive sprocket 8. Ring gear 7 and primary drive sprocket 8 form a right-angled drive. The embodiment shown here is therefore particularly suitable as an axle differential for a rear axle which can be selectively decoupled from the primary drivetrain. In place of the transmission of rotary torque via a right-angled drive indicated here, it is also possible for a spur gear to be configured on epicyclic gear housing U, which is driven via a further spur gear, by way of example. Such a variant is then particularly suitable for direct installation in a vehicle transmission.

Planetary carrier 3 sits between ring element R and brake disk pack BLP. The axial force transmission between ring element R and brake disk pack BLP is realized in this case primarily via planet pins 6 and planetary carrier 3 itself, braced by the same.

Planetary carrier 3 is composed of two carrier jackets 3a, 3b and carrier pin 3c. Carrier jackets 3a, 3b are each produced as molded sheet metal part. These two carrier jackets 3a, 3b and carrier pins 3c are welded to each other. For this purpose, rods are formed on first carrier jacket 3a, which as such bridge the tooth region. First carrier jacket 3a forms an inner bore hole in which an extension of first output sun gear 1 is accommodated in a manner allowing rotation. Brake disk pack BLP sits on carrier pin 3c. When brake disk pack BLP is fully braked, planetary carrier 3 can therefore be coupled by a friction fit to epicyclic gear housing U. Brake disk pack BLP and actuating mechanism 5 which is configured to load the same axially are designed in such a manner that it is possible for the drive torque applied to ring gear 7 to be transmitted to planetary carrier 3 via brake disk pack BLP when the same is loaded axially.

The mounting of planetary carrier 3 in epicyclic gear housing U is realized via first needle roller bearing L1 and second needle roller bearing L2. The mounting of epicyclic gear housing U in gear housing G is realized via angular ball bearings L3, L4. These angular ball bearings L3, L4 direct the gear reaction force components, which engage ring gear 7 and are oriented both radially and axially, into gear housing G. Neither bearing L1 nor bearing L2 need to convey axial forces. The primary purpose of these bearings L1, L2 is to center and mount planetary carrier 3 in epicyclic gear housing U. A shaft seal ring is inserted into seat S2 in order to accordingly establish a seal between the housing and the insert shaft (not illustrated).

The functionality of the differential gear according to the invention is as follows: Ring gear 7 is driven by primary drive sprocket 8. Ring gear 7 is fixed to epicyclic gear housing U in a manner preventing rotation. Accordingly, epicyclic gear housing U is made to rotate via ring gear 7. This epicyclic gear housing U is arranged concentrically with gear axle X, and mounted in gear housing G via first and second bearings L3, L4 in a manner allowing rotation.

Brake disk rings 4b of brake disk pack BLP which are also coupled to epicyclic gear housing U in a non-rotatable manner rotate together with the same. Brake disk pack BLP is loaded axially by pressure ring 4d and annular plate 4c according to the magnitude of the axial force generated by actuating mechanism 5, and are thereby optionally brought into a coupled state in which epicyclic gear housing U and planetary carrier 3 are coupled by a friction fit. A division of power is realized inside planetary carrier 3 via planets P1, P2 and output sun gears 1, 2.

The planetary gear train accommodated in this case in epicyclic gear housing U forms a spur gear differential, as already described. In the embodiment shown here, output sun gear 1, 2 and planet gears P1, P2 of planetary arrangement P are configured with a Wildhaber/Novikov toothing. First output sun gear 1 in this case has a toothing with a small addendum circle and concave tooth flank surfaces. Second output sun gear 2 has a toothing with a large addendum circle and convex tooth flank surfaces. The addendum circle diameter of first output sun gear 1, and theoretic root circle of second output sun gear 2 approximately correspond to the same, identical semicircle diameter. Both gears 1, 2 have the same number of teeth. First output sun gear 1 engages with revolving planets P1. Second output sun gear 2 engages with revolving planets P2. Revolving planets P1 have a large addendum circle diameter and form convex tooth flanks The revolving planets P2 have a small addendum circle diameter and form concave tooth flanks. Revolving planets P1, P2 engage with each other in pairs.

The engagement occurs in the engagement plane of first revolving planets P1 with first output sun gear 1. First revolving planets P1 have an axial length which corresponds substantially to the axial length of toothing 1a of first output sun gear 1. Second revolving planets P2 have an axial length which corresponds substantially to the sum of the axial lengths of toothings 1a, 2a of two output sun gears 1, 2.

It should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modification described as, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Thus, it is seen that the objects of the present invention are efficiently obtained, although modifications and changes to the invention should be readily apparent to those having ordinary skill in the art, which modifications are intended to be within the spirit and scope of the invention as claimed. It is also is understood that the foregoing description is illustrative of the present invention and should not be considered as limiting. Therefore, other embodiments of the present invention are possible without departing from the spirit and scope of the present invention.

What is claimed is:

1. A differential gear, comprising:
    a gear housing;
    an epicyclic gear housing arranged in said gear housing and operatively arranged to allow rotation about a gear axis;
    a planetary carrier arranged in said epicyclic gear housing coaxial to said gear axle;
    a first output sun gear;
    a second output sun gear;
    a planetary arrangement accommodated in said planetary carrier and operatively arranged to couple said first and said second output sun gears in a manner allowing rotation in opposite directions;
    a brake device having a brake disk pack (BLP) and operatively arranged to generate a coupling torque which couples said planetary carrier to said epicyclic gear housing; and,
    an actuating mechanism operatively arranged to generate an axial force which engages said brake device;
    wherein said planetary arrangement comprises multiple revolving planets which as such are able to rotate about planetary axes which are oriented parallel to said gear axle, and said brake device is designed in such a manner that said brake disk pack (BLP) is positioned at a radial distance of said planetary axes.

2. The differential gear recited in claim 1, wherein the brake disk pack (BLP) comprises multiple brake disks which are designed as annular disks.

3. The differential gear recited in claim 2, wherein the brake disks are kinematically coupled to said planetary carrier via an inner peripheral contour, in a manner allowing axial displacement, but which is nevertheless non-rotatable.

4. The differential gear recited in claim 3, wherein the brake disks are kinematically coupled to said epicyclic gear housing via an outer peripheral contour, in a manner allowing axial displacement, but which is nevertheless non-rotatable.

5. The differential gear recited in claim 1, wherein said axial load on the brake disk pack (BLP) occurs in interaction with a pressure ring element, and in that this pressure ring element is supported on end faces of the planet pins.

6. The differential gear recited in claim 1, wherein said epicyclic gear housing is designed as a bowl housing and comprises a first bowl element and a second bowl element, wherein said first bowl element has a base section which extends radially inward.

7. The differential gear recited in claim 6, wherein said base section of said first bowl element has passages, and in that a set of first plunger elements is accommodated in said passages, wherein said plunger elements can slide axially toward said planetary axes.

8. The differential gear recited in claim 1, wherein a roller guide ring is seated on plunger elements on a side of said plunger elements which is opposite the brake disk pack (BLP), said roller guide ring being able to be loaded axially via an annular piston to compress the brake disk pack (BLP) axially.

9. The differential gear recited in claim 8, wherein said annular piston is accommodated in a circular chamber which is concentric to said gear axle, and loads rollers of said roller guide ring which running on the same, in the direction of the brake disk pack (BLP), according to the magnitude of a fluid pressure applied to said circular chamber.

10. The differential gear recited in claim 1, wherein said planetary carrier is supported on plunger elements on the side thereof which is opposite the brake disk pack (BLP), and said plunger elements are guided through a base surface of said epicyclic gear housing, and are supported on the end face thereof on a second roller ring, such that the bearings are not additionally loaded by actuating forces of the brake disk pack (BLP).

* * * * *